United States Patent
Shih et al.

(10) Patent No.: US 11,294,488 B2
(45) Date of Patent: Apr. 5, 2022

(54) TOUCH DISPLAY DEVICE

(71) Applicant: TPK Touch Solutions (Xiamen) Inc., Xiamen (CN)

(72) Inventors: Hsueh-Han Shih, Taoyuan (TW); Ying-Fu Wang, New Taipei (TW); Chun Jung Huang, Taoyuan (TW); Shang-Yu Lin, Hsinchu (TW); Chi Tang, Taoyuan (TW)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 0 days.

(21) Appl. No.: 16/986,502

(22) Filed: Aug. 6, 2020

(65) Prior Publication Data
US 2022/0043524 A1    Feb. 10, 2022

(51) Int. Cl.
*G06F 3/041*    (2006.01)

(52) U.S. Cl.
CPC .................... *G06F 3/0412* (2013.01)

(58) Field of Classification Search
None
See application file for complete search history.

(56) References Cited

U.S. PATENT DOCUMENTS

| | | | |
|---|---|---|---|
| 2014/0339062 A1* | 11/2014 | Glad | G06F 3/03547 200/343 |
| 2016/0291391 A1* | 10/2016 | Yoshida | G02F 1/133308 |
| 2018/0074359 A1* | 3/2018 | Wang | G06F 1/1637 |
| 2018/0217693 A1* | 8/2018 | Li | G06F 3/0445 |

FOREIGN PATENT DOCUMENTS

| | | |
|---|---|---|
| CN | 104317459 A | 1/2015 |
| TW | 201633085 A | 9/2016 |
| TW | M605318 U | 12/2020 |

* cited by examiner

*Primary Examiner* — Brian M Butcher
(74) *Attorney, Agent, or Firm* — Cooper Legal Group, LLC

(57) ABSTRACT

A touch display device includes a cover plate, a touch module, a frame, and a display module. The touch module is disposed on the cover plate and defines thereon a sensing zone and a peripheral zone connecting each other. The frame is located at a side of the touch module away from the cover plate and includes a plurality of fixing members and an accommodating trough. The fixing members cross the peripheral zone to be fixed to the cover plate. At least one part of the touch module in the peripheral zone is attached to a side of the frame away from the cover plate. The display module is disposed in the accommodating trough and over the sensing zone.

20 Claims, 3 Drawing Sheets

TOUCH DISPLAY DEVICE

BACKGROUND

Technical Field

The present disclosure relates to a touch display device.

Description of Related Art

A current goal of a narrow border touch display device is mainly to minimize the width of the border (BM area) of the touch panel. The specific approach is that after the touch panel and the display panel are fully bonded, a part of the touch panel that extends beyond the sensing zone is bent along the non-bonding zone on the outer edge of the display panel to the back of the display panel and then fixed by adhesive.

In order to achieve a narrow border for a touch display device, the cover plate and the display panel are usually fixed and assembled together by only relying on optically clear adhesive (OCA). However, when manufacturing a large-size touch display device (e.g., a touch panel over 55 inches), considering the yield and convenience of assembly, the cover plates must have a certain thickness and weight to maintain a certain degree of toughness. Therefore, it is difficult for the cover plate to be stably fixed and assembled on the display panel by only relying on a layer of OCA.

Accordingly, how to provide a touch display device to solve the aforementioned problems becomes an important issue to be solved by those in the industry.

SUMMARY

An aspect of the disclosure is to provide a touch display device that can efficiently solve the aforementioned problems.

According to an embodiment of the disclosure, a touch display device includes a cover plate, a touch module, a frame, and a display module. The touch module is disposed on the cover plate and defines thereon a sensing zone and a peripheral zone connecting each other. The frame is located at a side of the touch module away from the cover plate and includes a plurality of fixing members and an accommodating trough. The fixing members cross the peripheral zone to be fixed to the cover plate. At least one part of the touch module in the peripheral zone is attached to a side of the frame away from the cover plate. The display module is disposed in the accommodating trough and over the sensing zone.

In an embodiment of the disclosure, the touch module has a plurality of through holes in the peripheral zone. The fixing members respectively pass through the through holes to be fixed to the cover plate.

In an embodiment of the disclosure, the touch module includes a first flexible sensing electrode layer. The through holes run through the first flexible sensing electrode layer.

In an embodiment of the disclosure, the touch module further includes a first wiring layer. The first wiring layer is connected to the first flexible sensing electrode layer. At least one of the through holes runs through the first wiring layer.

In an embodiment of the disclosure, the at least one part of the touch module in the peripheral zone includes an outer edge portion of the first flexible sensing electrode layer.

In an embodiment of the disclosure, the touch module further includes a second flexible sensing electrode layer. The first flexible sensing electrode layer and the second flexible sensing electrode layer are stacked on the cover plate. The through holes run through the second flexible sensing electrode layer.

In an embodiment of the disclosure, the touch module further includes a second wiring layer. The second wiring layer is connected to the second flexible sensing electrode layer. At least one of the through holes runs through the second wiring layer.

In an embodiment of the disclosure, the through holes are arranged along at least three edges of the sensing zone.

In an embodiment of the disclosure, the touch display device further includes a plurality of adhesive layers respectively adhered between the fixing members and the cover plate.

In an embodiment of the disclosure, the touch module is a GF2 type touch module or a GFF type touch module.

Accordingly, in the touch display device of the present disclosure, by arranging a plurality of fixing members on the frame configured to carry the display module and making the fixing members cross the peripheral zone outside the sensing zone of the touch panel to be fixed to the cover plate, the assembled structure of the touch module and the display module of large-size can achieve sufficient bearing strength.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
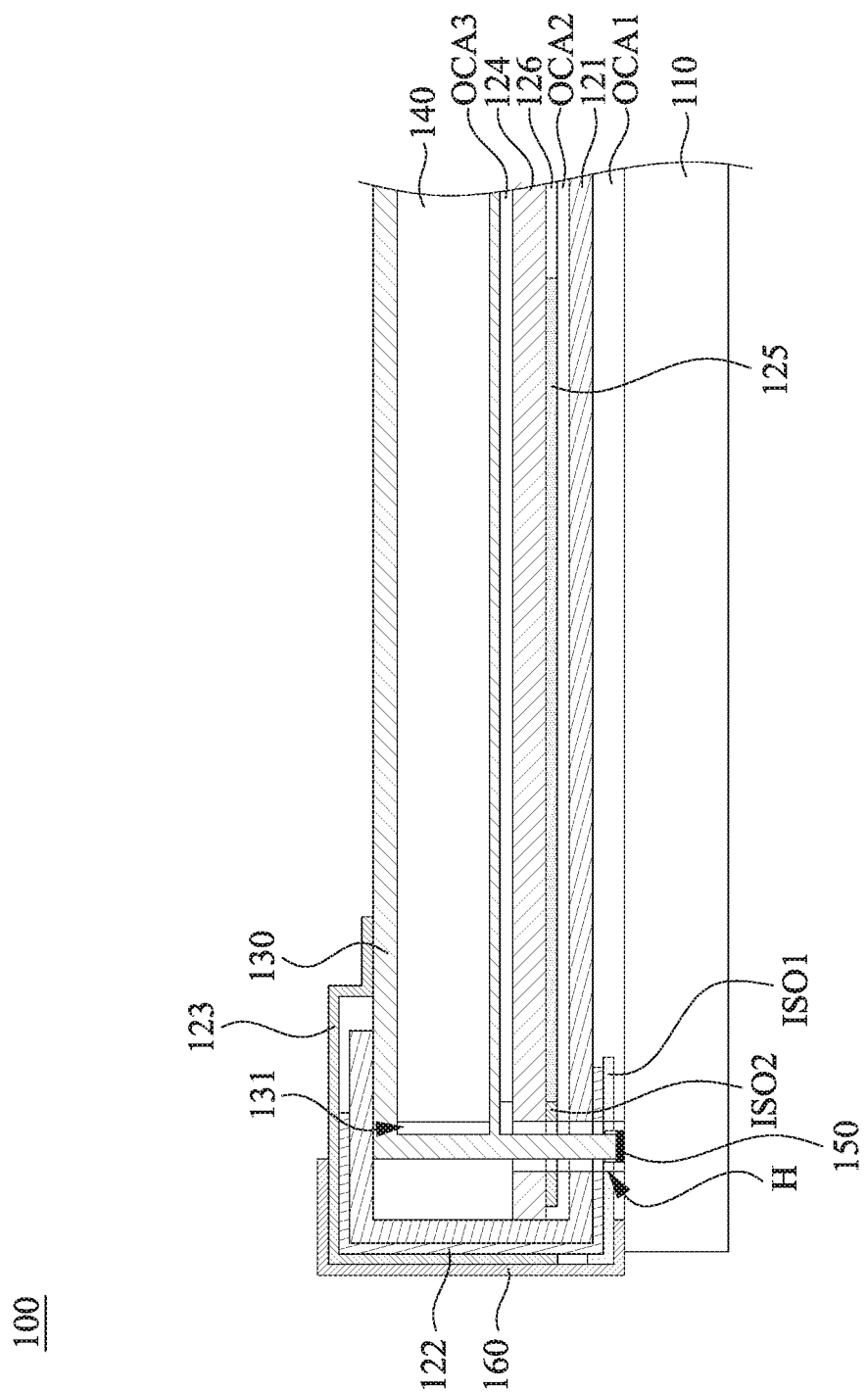
FIG. 1A is a cross-sectional view of a touch display device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1B:
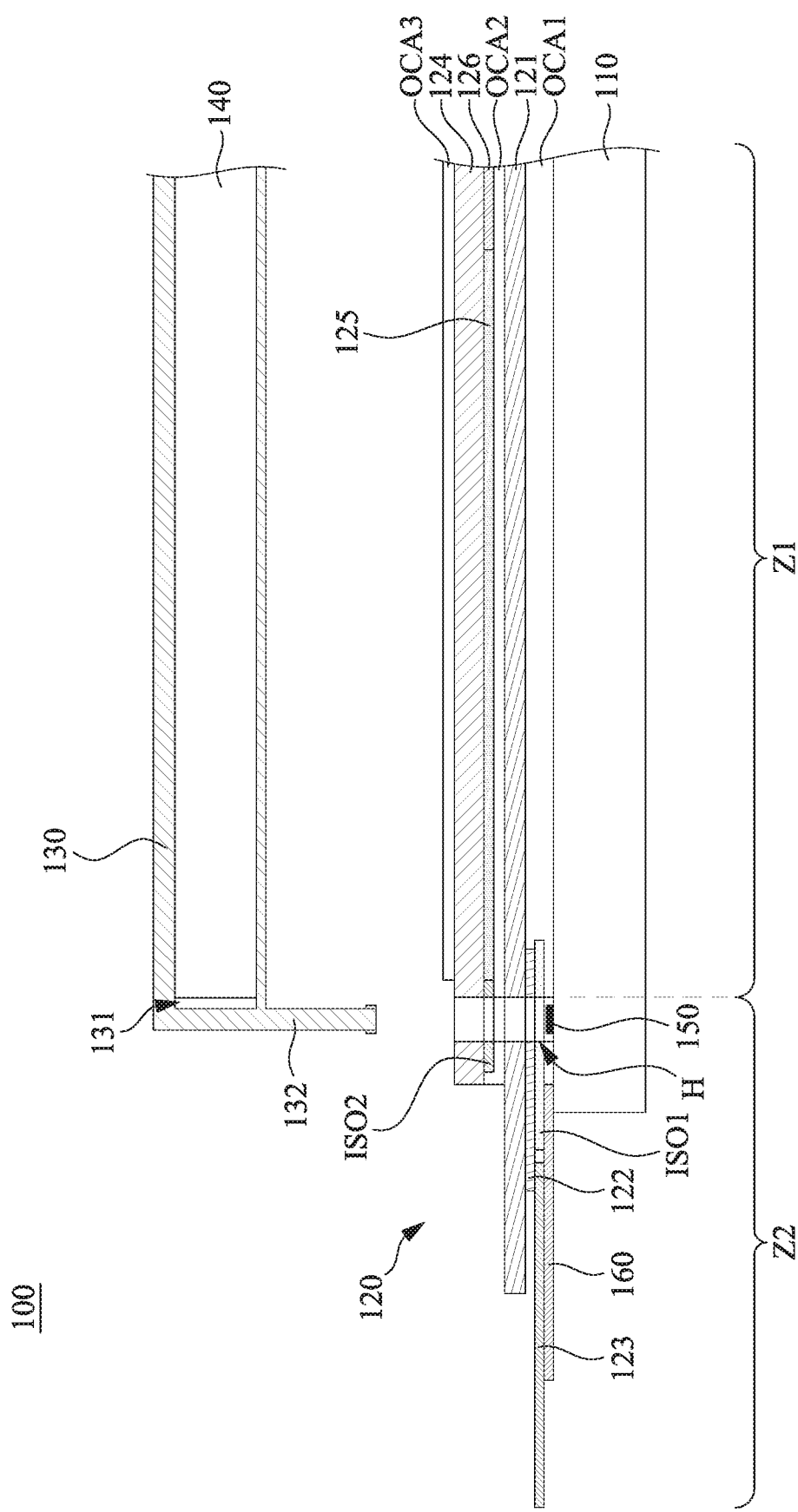
FIG. 1B is another cross-sectional view of the touch display device in FIG. 1A, in which a frame and a display module are upwardly separated.

Reference is made to FIGS. 1A and 1B. FIG. 1A is a cross-sectional view of a touch display device 100 according to an embodiment of the disclosure. FIG. 1B is another cross-sectional view of the touch display device 100 in FIG. 1A, in which a frame 130 and a display module 140 are upwardly separated. As shown in FIGS. 1A and 1B, in the present embodiment, the touch display device 100 includes a cover plate 110, a touch module 120, the frame 130, and the display module 140. The touch module 120 is disposed on the cover plate 110 and has a sensing zone Z1 and a peripheral zone Z2 connecting to each other. The frame 130 is located at a side of the touch module 120 away from the cover plate 110 and includes a plurality of fixing members 132 and an accommodating trough 131. The fixing members 132 cross the peripheral zone Z2 of the touch module 120 to be fixed to the cover plate 110. At least one part of the touch module 120 in the peripheral zone Z2 is attached to a side of the frame 130 away from the cover plate 110. The display module 140 is disposed in the accommodating trough 131 and over the sensing zone Z1.

Figure 2:
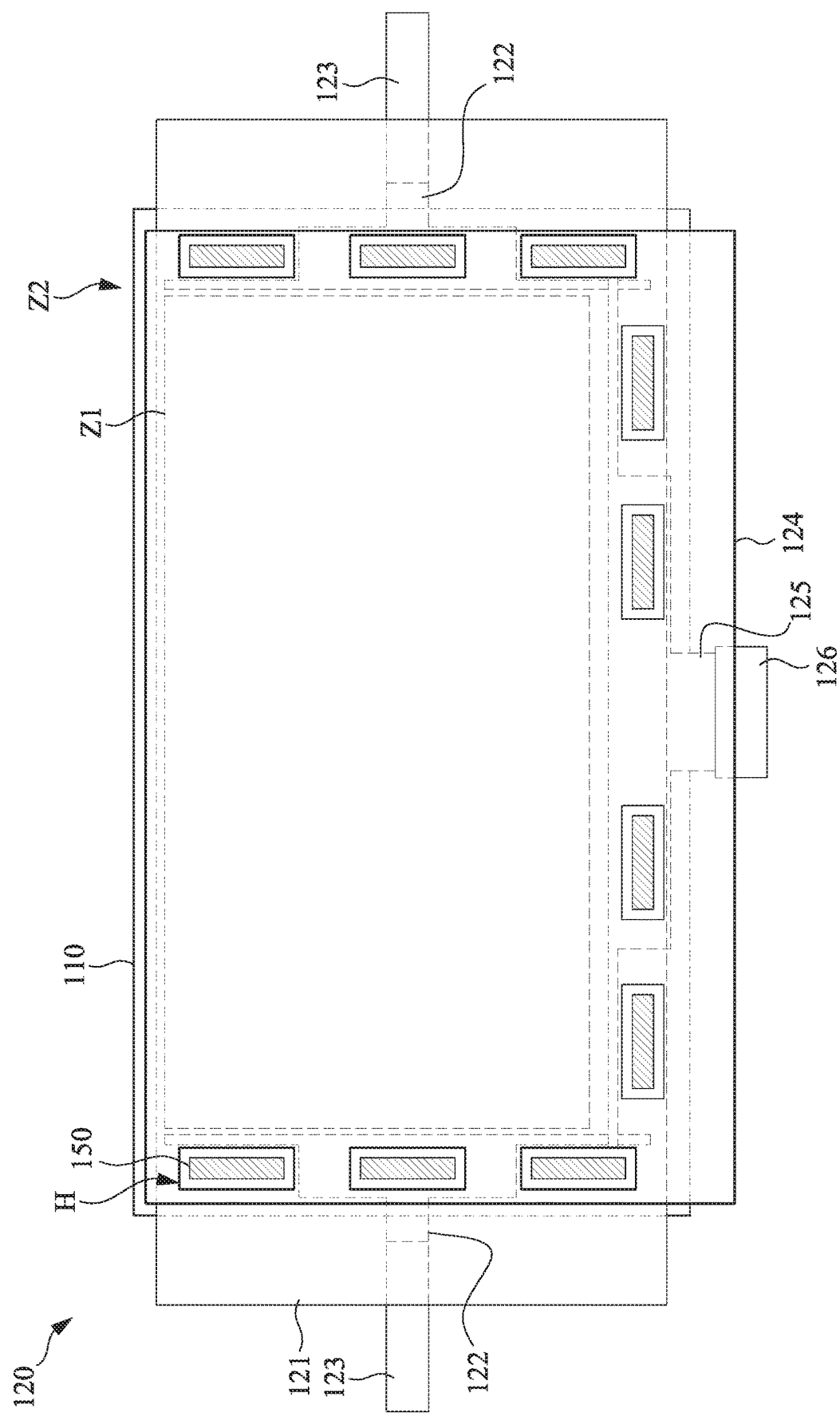
FIG. 2 is a top view of a cover plate and a touch module in FIG. 1A.

Reference is made to FIG. 2. FIG. 2 is a top view of the cover plate 110 and the touch module 120 in FIG. 1A. As shown in FIG. 2, in the present embodiment, the touch module 120 has a plurality of through holes H in the peripheral zone Z2. The fixing members 132 respectively pass through the through holes H to be fixed to the cover plate 110. The touch display device 100 further includes a plurality of adhesive layers 150. The adhesive layers 150 are respectively disposed in the through holes H and are respectively adhered between the fixing members 132 and the cover plate 110. With the aforementioned structural configurations, the assembled structure of the touch module 120 and the display module 140 of large-size can achieve sufficient bearing strength.

In some embodiments, the adhesive layers 150 are double-sided tapes (e.g., 3M's VHB tapes or other high bond tape having an adhesive strength of at least 60 oz./inch or at least 90 oz./inch) or other equivalent adhesives, but the disclosure is not limited in this regard.

In some embodiments, as shown in FIG. 2, the through holes H are arranged along at least three edges of the sensing zone Z1, but the disclosure is not limited in this regard. In practical applications, the through holes H can also be arranged along two opposite edges or four edges of the sensing zone Z1.

The detailed structure of the touch module 120 is described in further detail below. As shown in FIGS. 1A and 2, in the present embodiment, the touch module 120 includes a first flexible sensing electrode layer 121, at least one first wiring layer 122, at least one first flexible circuit board 123, a second flexible sensing electrode layer 124, a second wiring layer 125, a second flexible circuit board 126, and two insulating layers ISO1, ISO2. The first flexible sensing electrode layer 121 is attached to a surface of the cover plate 110 after being coated with an optical-grade transparent adhesive OCA1 and overlaps the sensing zone Z1 and the peripheral zone Z2 of the display module 140. The first wiring layer 122 is electrically connected to the first flexible sensing electrode layer 121 so as to conduct and transmit electrode signals of the first flexible sensing electrode layer 121. The first wiring layer 122 is adjacent to one of the opposite edges of the first flexible sensing electrode layer 121 and extends in the peripheral zone Z2 of the display module 140. The first flexible circuit board 123 is electrically connected to the first wiring layer 122 and extends away from the sensing zone Z1 of the display module 140 to the peripheral zone Z2 in an opposite direction. Both the first wiring layer 122 and the first flexible circuit board 123 extend on the side of the first flexible sensing electrode layer 121 adjacent to the cover plate 110. In addition, an insulating layer ISO1 can be selectively disposed between the optical-grade transparent adhesive OCA1 and the first wiring layer 122, so as to achieve electrical insulation between the optical-grade transparent adhesive OCA1 and the first wiring layer 122.

The second flexible sensing electrode layer 124 is stacked on the first flexible sensing electrode layer 121 and attached to the first flexible sensing electrode layer 121 via an optical-grade transparent adhesive OCA2. In detail, the optical-grade transparent adhesive OCA2 is disposed at a side of the first flexible sensing electrode layer 121 away from the cover plate 110. The insulating layer ISO2 is disposed on the optical-grade transparent adhesive OCA2 to shield the surface of the first wiring layer 122 disposed on the first flexible sensing electrode layer 121 in the peripheral zone Z2 and part of the sensing zone Z1. In this way, the effect of line insulation can be achieved. The second flexible sensing electrode layer 124 is disposed on the side of the insulating layer ISO2 away from the first flexible sensing electrode layer 121. The second wiring layer 125 (see FIG. 2) is electrically connected to the second flexible sensing electrode layer 124 so as to conduct and transmit electrode signals of the second flexible sensing electrode layer 124. The second wiring layer 125 is adjacent to an edge of the second flexible sensing electrode layer 124 and extends in the peripheral zone Z2 of the display module 140. The second flexible circuit board 126 is electrically connected to the second wiring layer 125 and extends away from the sensing zone Z1 of the display module 140 to the peripheral zone Z2. Both the second wiring layer 125 and the second flexible circuit board 126 extend on the side of the second flexible sensing electrode layer 124 adjacent to the first flexible circuit board 123. In addition, the second flexible sensing electrode layer 124 is adhered to the frame 130 or to the surface of the display module 140 at the same time via the optical-grade transparent adhesive OCA3.

In some embodiments, as shown in FIG. 2, all the through holes H run through the first flexible sensing electrode layer 121 and the second flexible circuit board 126.

In some embodiments, as shown in FIG. 2, the first wiring layer 122 and the second wiring layer 125 respectively extend to edges of the sensing zone Z1 of the touch module 120. The first wiring layer 122 is run through at least one through hole H, and the second wiring layer 125 is run through at least two through holes H, but the disclosure is not limited in this regard.

In some embodiments, as shown in FIGS. 1A and 2, the at least one part of the touch module 120 in the peripheral zone that is attached to the side of the frame 130 away from the cover plate 110 includes an outer edge portion of the first flexible sensing electrode layer 121, a part of the at least one first flexible circuit board 123, an outer edge portion of the second flexible sensing electrode layer 124, and a part of the second flexible circuit board 126.

As shown in FIG. 1A, in the present embodiment, the touch display device 100 further includes a protective layer 160. The protective layer 160 can be selectively attached to a side of the outer edge portion of the first flexible sensing electrode layer 121 or the second flexible sensing electrode layer 124 adjacent to the cover plate 110. With the outer edge portion bent and attached to the side of the frame 130 away from the cover plate 110, the first flexible sensing electrode layer 121 or the second flexible sensing electrode layer 124 is protected.

In some embodiments, at least one of the first wiring layer 122 or the second wiring layer 125 is a silver wiring layer, but the disclosure is not limited in this regard.

In some embodiments, the touch module 120 is a GF2 type touch module or a GFF type touch module. Specifically, the aforementioned GF2 type means that the first flexible sensing electrode layer 121 and the second flexible sensing electrode layer 124 are distributed on the same substrate.

The aforementioned GFF type means that the first flexible sensing electrode layer 121 and the second flexible sensing electrode layer 124 are respectively distributed on two substrates.

In some embodiments, the material of the cover plate 110 includes glass or a flexible polymer material, but the disclosure is not limited in this regard.

In some embodiments, at least one of the first flexible sensing electrode layer 121 or the second flexible sensing electrode layer 124 may be a silver nanowire electrode layer, a metal grid, or an electrode layer including indium tin oxide (ITO), but the disclosure is not limited in this regard.

According to the foregoing recitations of the embodiments of the disclosure, it can be seen that in the touch display device of the present disclosure, by arranging a plurality of fixing members on the frame configured to carry the display module and making the fixing members cross the peripheral zone outside the sensing zone of the touch panel to be fixed to the cover plate, the assembled structure of the touch module and the display module of large-size can achieve sufficient bearing strength.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch display device, comprising:
   a cover plate;
   a touch module disposed on the cover plate and defining thereon a sensing zone and a peripheral zone connecting each other;
   a frame located at a side of the touch module away from the cover plate and comprising a plurality of fixing members and an accommodating trough, wherein:
      the fixing members cross the peripheral zone to be fixed to the cover plate, and
      at least one part of the touch module in the peripheral zone is attached to an outer side of the frame diametrically opposite to the cover plate; and
   a display module disposed in the accommodating trough and over the sensing zone.

2. The touch display device of claim 1, wherein:
   the touch module has a plurality of through holes in the peripheral zone, and
   the fixing members respectively pass through the through holes to be fixed to the cover plate.

3. The touch display device of claim 2, wherein:
   the touch module comprises a first flexible sensing electrode layer, and
   the through holes run through the first flexible sensing electrode layer.

4. The touch display device of claim 3, wherein:
   the touch module further comprises a first wiring layer,
   the first wiring layer is connected to the first flexible sensing electrode layer, and
   at least one of the through holes runs through the first wiring layer.

5. The touch display device of claim 3, wherein the at least one part of the touch module in the peripheral zone comprises an outer edge portion of the first flexible sensing electrode layer.

6. The touch display device of claim 3, wherein:
   the touch module further comprises a second flexible sensing electrode layer,
   the first flexible sensing electrode layer and the second flexible sensing electrode layer are stacked on the cover plate, and
   the through holes run through the second flexible sensing electrode layer.

7. The touch display device of claim 6, wherein:
   the touch module further comprises a second wiring layer,
   the second wiring layer is connected to the second flexible sensing electrode layer, and
   at least one of the through holes runs through the second wiring layer.

8. The touch display device of claim 2, wherein the through holes are arranged along at least three edges of the sensing zone.

9. The touch display device of claim 1, further comprising a plurality of adhesive layers respectively adhered between the fixing members and the cover plate.

10. The touch display device of claim 1, wherein the touch module is a GF2 type touch module or a GFF type touch module.

11. The touch display device of claim 1, wherein the display module is between the cover plate and the at least one part of the touch module.

12. The touch display device of claim 1, wherein:
   the touch module comprises a first flexible sensing electrode layer, and
   the at least one part of the touch module comprises a portion of the first flexible sensing electrode layer.

13. A touch display device, comprising:
   a cover plate;
   a touch module disposed on the cover plate and defining thereon a sensing zone and a peripheral zone connecting each other, wherein:
      the touch module comprises a first flexible sensing electrode layer,
      the touch module has a plurality of through holes in the peripheral zone, and
      the through holes run through the first flexible sensing electrode layer;
   a frame located at a side of the touch module away from the cover plate and comprising a plurality of fixing members and an accommodating trough, wherein:
      the fixing members cross the peripheral zone and respectively pass through the through holes to be fixed to the cover plate, and
      at least one part of the touch module in the peripheral zone is attached to a side of the frame away from the cover plate; and
   a display module disposed in the accommodating trough and over the sensing zone.

14. The touch display device of claim 13, wherein:
   the touch module further comprises a first wiring layer,
   the first wiring layer is connected to the first flexible sensing electrode layer, and
   at least one of the through holes runs through the first wiring layer.

15. The touch display device of claim 13, wherein the at least one part of the touch module in the peripheral zone comprises an outer edge portion of the first flexible sensing electrode layer.

16. The touch display device of claim 13, wherein:
the touch module further comprises a second flexible sensing electrode layer,
the first flexible sensing electrode layer and the second flexible sensing electrode layer are stacked on the cover plate, and
the through holes run through the second flexible sensing electrode layer.

17. The touch display device of claim 16, wherein:
the touch module further comprises a second wiring layer,
the second wiring layer is connected to the second flexible sensing electrode layer, and
at least one of the through holes runs through the second wiring layer.

18. A touch display device, comprising:
a cover plate;
a touch module disposed on the cover plate and defining thereon a sensing zone and a peripheral zone connecting each other, wherein the touch module comprises a first flexible sensing electrode layer;
a frame located at a side of the touch module away from the cover plate and comprising a plurality of fixing members and an accommodating trough, wherein the fixing members cross the peripheral zone to be fixed to the cover plate; and
a display module disposed in the accommodating trough and over the sensing zone, wherein:
a first portion of the first flexible sensing electrode layer is between the display module and the cover plate, and
the display module is between the cover plate and a second portion of the first flexible sensing electrode layer.

19. The touch display device of claim 18, wherein the fixing members respectively pass through the first flexible sensing electrode layer.

20. The touch display device of claim 18, wherein:
the touch module further comprises a first wiring layer,
a first portion of the first wiring layer is between the display module and the cover plate, and
the display module is between the cover plate and a second portion of the first wiring layer.

* * * * *